United States Patent [19]

Palermo et al.

[11] Patent Number: 4,683,266
[45] Date of Patent: Jul. 28, 1987

[54] COMPOSITIONS THICKENED THROUGH URETHANE REACTION

[75] Inventors: Anthony C. Palermo; Roger M. Christenson, both of Gibsonia, Pa.; Glenn L. Mazza, Milford, Mich.

[73] Assignee: Ashland Oil, Inc., Russell, Ky.

[21] Appl. No.: 796,031

[22] Filed: Nov. 7, 1985

Related U.S. Application Data

[63] Continuation of Ser. No. 713,122, Mar. 18, 1985, abandoned, which is a continuation of Ser. No. 500,585, Jun. 2, 1983, abandoned.

[51] Int. Cl.[4] .......................... C08F 8/00; C08L 75/00
[52] U.S. Cl. .................................... 525/123; 525/111; 525/28; 525/75; 525/454
[58] Field of Search ................. 525/123, 111, 454, 28, 525/75

[56] References Cited

U.S. PATENT DOCUMENTS 4,210,713   7/1980   Sumiyoshi et al. ................. 525/75

Primary Examiner—Lewis T. Jacobs
Assistant Examiner—A. Carrillo
Attorney, Agent, or Firm—Mary E. Picken

[57] ABSTRACT

A thickened composition which is cured by free-radical initiated polymerization is composed of a compound containing at least two ethylenically unsaturated double bonds per molecule; an active hydrogen-containing homopolymer or copolymer of a diene having a number average molecular weight of from 500 to 15,000; the active hydrogens being derived from hydroxyl, amino, or mercapto groups; and an organic polyisocyanate present in an amount sufficient to thicken said composition without gelation.

5 Claims, No Drawings

COMPOSITIONS THICKENED THROUGH URETHANE REACTION

This application is a continuation of application Ser. No. 713,122, filed Mar. 18, 1985 now abandoned, which in turn is a continuation of Ser. No. 500,585 filed June 2, 1983 now abandoned.

BACKGROUND OF THE INVENTION

The present invention relates to thickened curable compositions, to methods of molding such thickened compositions, and to molded products prepared by these methods.

The use of polymeric materials as substitutes for such traditional structural materials as wood or metal has achieved widespread acceptance and continues to grow. Molded plastics, in particular, have become quite prevalent, especially in production of automobile body parts, household appliance casings, toys, and furniture. A large proportion of such molded plastics are produced from unsaturated polyester resin based molding compounds, two typically utilized forms being sheet molding compound (SMC) and bulk molding compound (BMC). Unsaturated polyester resin based molding compounds, however, tend to be tacky and exhibit non-uniform flow properties, therefore a thickening agent is generally added to such compounds to reduce stickiness as well as to assist in making the flow of the composition uniform at molding. Many techniques for thickening unsaturated polyester resin based molding compositions have been developed, although generally inorganic additives such as alkaline earth oxides and hydroxides, for example, magnesium and calcium oxides and hydroxides, are utilized. These techniques, however, are not without attendant difficulties, for instance, thickening may either be inadequate resulting in a molding composition which cannot be handled or thickening may continue beyond the desired level resulting in a very hard, brittle, unacceptable molding compound.

Although perhaps the best known and most commonly utilized, unsaturated polyester resin based molding compositions are not the only types of molding compositions which generally require thickening prior to molding. Moreover some of these types of molding compositions cannot be thickened conventionally by the addition of alkaline earth oxides and hydroxides because due to their monomeric content they lack the requisite functional groups. For example, Canadian Pat. No. 1,125,943 the disclosure of which is hereby incorporated by reference, is directed to such curable compositions which cannot be thickened in a conventional manner. Broadly stated, the curable composition of the aforesaid Canadian patent comprises a compound containing at least two polymerizable vinyl groups per molecule; a polydiene polymer; optionally a polymerizable monovinyl compound and alumina trihydrate.

There are known in the art other methods of thickening besides the use of alkaline earth oxides and hydroxides. For example, U.S. Pat. No. 4,289,684 to Kallaur teaches that unsaturated polyester resin based SMC can be thickened by the addition of a polyhydroxy polyacrylate or polyhydroxy polymethacrylate and an organic polyisocyanate. The reaction between the polyisocyanate and polyacrylate or polymethacrylate provides thickening. This patent however is very limited since it does not provide for reaction of other materials with the polyisocyanate. In connection with this use of polyisocyanate, Japanese Pat. Publication No. 22617/1970 teaches vulcanization of a rubber blend formed by blending and kneading a rubber material, a reinforcing filler and polybutadiene glycol with polyfunctional isocyanate. Vulcanization, however, differs greatly from cure of generally utilized molding compounds such as SMC, BMC, and the types of compositions disclosed in the aforesaid Canadian Pat. No. 1,125,943. The latter cure by free-radical initiated polymerization whereas vulcanization occurs by crosslinking of the unsaturated hydrocarbon chain of rubber with sulphur by application of heat. This patent is also very limited and extrapolation to free-radical initiated polymerizable molding compositions is not suggested.

In view of the limitations of these art-recognized techniques a method of thickening is needed which can be utilized with any free-radical initiated polymerizable composition.

SUMMARY OF THE INVENTION

In accordance with the present invention, there is provided a thickened composition which is cured by free-radical initiated polymerization, comprising:

(a) a compound containing at least two ethylenically unsaturated double bonds per molecule;

(b) an active hydrogen-containing homopolymer or copolymer of a diene having a number average molecular weight of from 500 to 15,000, the active hydrogens being derived from hydroxyl, amino, or mercapto groups; and (c) an organic polyisocyanate present in an amount sufficient to thicken said composition without gelation.

Also provided in accordance with the present invention is the following improved method of molding: A method of molding a thickened composition which is cured by free-radical initiated polymerization, comprising (I) depositing the composition into the cavity of a mold, (II) subjecting the composition to heat and pressure to at least partially cure the composition, (III) removing the at least partially cured molded article from the mold, characterized in that the thickened composition comprises:

(a) a compound containing at least two ethylenically unsaturated double bonds per molecule;

(b) an active hydrogen-containing homopolymer or copolymer of a diene having a number average molecular weight of from 500 to 15,000, the active hydrogens being derived from hydroxyl, amino, or mercapto groups; and (c) an organic polyisocyanate present in an amount sufficient to thicken said composition without gelation.

DETAILED DESCRIPTION OF THE INVENTION

The thickened compositions of the present invention comprise three principal components. One component is a compound containing at least two ethylenically unsaturated double bonds per molecule. Exemplary of the compound containing at least two ethylenically unsaturated double bonds per molecule are esters having 2 to 5, preferably 2 to 3, ester groups and at least 2, preferably 2 to 3, ethylenically unsaturated double bonds. Included are di, tri, tetra and penta esters of saturated polyhydric alcohols with unsaturated monocarboxylic acids as well as esters of saturated polycarboxylic acids with unsaturated polyhydric alcohols. The esters are non-volatile liquids at temperatures at which they are mixed and preferably contain from about 6 to 30 carbon atoms, preferably 6 to 22 carbon atoms. Examples of the former esters are those formed from reacting an unsaturated monocarboxylic acid having from 3 to 16 carbon atoms such as acrylic acid, methacrylic acid and ethacrylic acid with a saturated polyhydric alcohol containing 2 to 16 carbon atoms, preferably 2 to 10 carbon atoms such as ethylene glycol, diethylene glycol, propylene glycol, dipropylene glycol, neopentyl glycol, 1,4-butanediol, 1-6-hexanediol, trimethylolpropane, trimethylolmethane, glycerin, pentaerythritol and 2,2-dimethyl-3-hydropropyl-2,2-dimethyl-3-hydroxypropionate. These types of esters are disclosed in U.S. Pat. No. 3,438,933 which is incorporated by reference into the present disclosure.

Examples of the latter esters are those formed from reacting a saturated polycarboxylic acid having from about 3 to 10 carbon atoms such as malonic acid, glutaric acid, succinic acid, adipic acid, and azelaic acid with an unsaturated polyhydric alcohol such as allyl alcohol or methallyl alcohol. These types of esters are disclosed in U.S. Pat. No. 3,438,933 which is incorporated by reference into the present disclosure.

A preferred group of ethylenically unsaturated compounds having at least two ethylenically unsaturated double bonds per molecule are unsaturated polyesters which are formed from an ethylenically unsaturated polycarboxylic acid and a saturated polyhydric alcohol. Exemplary of useful unsaturated polyesters are those formed from ethylenically unsaturated polycarboxylic acids or anhydrides thereof where they exist such as maleic acid, fumaric acid, itaconic acid, mesaconic acid and ethyl maleic acid with a saturated alcohol such as ethylene glycol, propylene glycol, 1-5-pentanediol and 1,4-cyclohexane dimethanol. Unsaturated polyesters of this type are described in detail in U.S. Pat. No. 4,041,008 to Makhlouf et al which is incorporated by reference into the present disclosure.

Also preferred for use in the present invention as the ethylenically unsaturated compound are vinyl ester resins, particularly polyacrylates or polymethacrylates prepared from the reaction of an ethylenically unsaturated monocarboxylic acid having from 3 to 16 carbon atoms and a polyepoxide resin. The preparation of these vinyl esters is described in detail in U.S. Pat. No. 3,674,893 which is incorporated by reference into the present disclosure.

Briefly, any number of polyepoxides may be utilized in preparing the aforesaid vinyl esters. For example, glycidyl polyethers of both polyhydric alcohols and polyhydric phenols, epoxy novolacs, epoxidized fatty acids or drying oil acids, and epoxidized diolefins. Useful ethylenically unsaturated monocarboxylic acids include acrylic acid, methacrylic acid, halogenated acrylic or methacrylic acids, cinnamic acid, and hydroxyalkyl acrylate or methacrylate half esters of both aliphatic and aromatic dicarboxylic acids such as, for example, ortho-phthalic acid, terephthalic acid, succinic acid, and maleic acid. In a preferred embodiment of the present invention the polyhydroxy polyacrylate or polyhydroxy polymethacrylate is prepared from acrylic acid or methacrylic acid and polyglycidyl materials such as the diglycidyl ether of bisphenol-A or the polyglycidyl ether of phenol formaldehyde resins.

The compositions of the present invention usually contain a polymerizable monovinyl compound. This monovinyl compound is a necessary component when an unsaturated polyester (those described above as prepared from an ethylenically unsaturated polycarboxylic acid and a saturated polyhydric alcohol) is utilized as the ethylenically unsaturated compound, but only optional, although preferred, when the ethylenically unsaturated compound is a vinyl ester prepared from a polyepoxide and an unsaturated monocarboxylic acid or one of the other polyol-polyacrylate esters described above.

Suitable monovinyl compounds copolymerizable with unsaturated polyesters include styrene, methyl styrene, chlorostyrene, vinyl toluene, divinyl benzene, vinyl acetate, vinyl propionate, allyl acetate, allyl propionate, lower alkyl esters of acrylic and methacrylic acid containing from 1 to 4 carbon atoms in the alkyl group such as methyl methacrylate, and ethyl acrylate, and mixtures thereof. The monovinyl compound is present in an amount of at least 10 percent by weight, typically up to 75 percent by weight but preferably within the range of from about 20 percent to about 60 percent by weight, more preferably 20 to 50 percent by weight. The percentages being based upon the total amount of unsaturated polyester and monovinyl compound which is present in the composition.

Another component of the thickened compositions of the present invention is an active hydrogen-containing homopolymer or copolymer of a diene having a number average molecular weight of from 500 to 15,000. The active hydrogens of the diene can be derived from hydroxyl, carboxyl or amino groups, although preferably the diene contains hydroxyl groups and more preferably is hydroxyl-terminated. Suitable active hydrogen-containing polydiene polymers are normally liquids at room temperature and preferably have a number average molecular weight of 1000 to 5000. Polydienes having a molecular weight of less than 500 are not preferred because unsatisfactory physical properties in the final cured product result, whereas polydienes having a molecular weight greater than 15,000 are not preferred because they result in viscosity levels which are too high.

The polydiene polymers include polymers of 1,3-dienes containing from 4 to 12 and preferably from 4 to 6 carbon atoms. Typical dienes include 1,3-butadiene which is preferred, 2,3-dimethyl-1,3-butadiene, isoprene and piperylene. Also, copolymers of 1,3-butadiene and a monomer copolymerizable with 1,3-butadiene such as isoprene, acrylonitrile, and piperylene can be used. Other polymerizable monomers such as methyl methacrylate, acrylic acid, and styrene can also be used. Also useful herein are hydrogenated plydiene polymers.

The organic polyisocyanate component can be an aliphatic polyisocyanate, including a cycloaliphatic polyisocyanate or an aromatic polyisocyanate; preferably an organic diisocyanate is employed. Useful aliphatic diisocyanates include ethylene diisocyanate, 1,2-diisocyanatopropane, 1,3-diisocyanatopropane, 1,6-diisocyanatohexane, 1,4-butylene diisocyanate, 1,6-hexamethylene diisocyanate, lysine diisocyanate, 1,4-methylene bis(cyclohexyl isocyanate) and isophorone diisocyanate. Useful aromatic diisocyanates include toluene diisocyanates, meta-xylene-diisocyanate, para-xylene-diisocyanate, 4-chloro-1,3-phenylene diisocyanate, 1,5-tetrahydro-naphthalene diisocyanate, 4,4'-dibenzyl diisocyanate and 1,2,4-benzene triisocyanate.

The compound containing at least two ethylenically unsaturated double bonds per molecule contributes hardness and structural strength to the cured compositions of the present invention. This component typically constitutes from about 20 percent to about 60 percent by weight of the composition, preferably from about 25 to 55 percent by weight, the percentages being based upon the total weight of the resinous components. Amounts less than 5 percent are not preferred because the cured composition will have relatively poorer hardness and structural strength. Amounts greater than 80 percent are not preferred because of relative brittleness and relatively poorer appearance of the cured articles.

The active hydrogen containing polydiene component contributes surface smoothness and flexibility in the cured articles. The polydiene component typically constitutes from about 5 percent to about 35 percent by weight, preferably from 10 to 25 percent by weight, the percentages being based upon the total weight of the resinous components. Amounts less than 1 percent are not preferred because of relative brittleness and relatively poorer surface appearance of the cured articles. Amounts in excess of 45 percent are not preferred because the compositions may have reduced structural strength and high viscosities as well as difficulty in curing.

The organic polyisocyanate component contributes to the composition's ability to thicken and thus reach the desired viscosity level prior to curing. The polyisocyanate component is present in the claimed composition in an amount sufficient to thicken the composition without gelation. Typically it is present in an amount such that the NCO to OH equivalent ratio of the composition is within the range of 0.05 to 1.5:1. Amounts of polyisocyanate less than those within this range are not preferred because of relatively poorer thickening. Amounts greater than those within this range are not preferred because of higher viscosities and the potential for gelation. Usually, the thickened compositions of the present invention have an HBT Brookfield viscosity ranging from about $2 \times 10^6$ centipoises to about $160 \times 10^6$ centipoises at 80° F. (27° C.) and TF spindle at 1 Revolution per Minute (RPM). Preferred viscosities are within the range of $10 \times 10^6$ centipoises to $70 \times 10^6$ centipoises under the aforestated conditions.

The compositions of the present invention are cured by free radical initiated vinyl addition polymerization. This type of polymerization is very well known and can generally be divided into three steps: initiation, propagation and termination. During initiation a free radical initiating catalyst reacts with either an ethylenically unsaturated monomer or polymer to form a free radical, a molecular fragment having one or more unpaired electrons. Suitable free radical initiating catalysts include benzoyl peroxide, tertiary-butyl perbenzoate, tertiary-butyl peroctoate, tertiary-butyl hydroperoxide, cumene hydroperoxide, azobis(isobutyronitrile), methyl ethyl ketons peroxide, and the like. The free radical initiating catalyst is generally utilized in amounts of from about 0.5 to 2.5 percent by weight based on the total weight of the resinous ingredients. During propagation the free radical reacts with the double bond of another ethylenically unsaturated monomer or polymer by adding to it on one side. At the same time a new free electron is produced on the other side which can further engage in propagation. This process continues until termination occurs, that is, two free radical containing species come together and form a molecular bond so that no new free radicals are produced. As was stated above, this type of polymerization is well known to those skilled in the art and therefore a detailed description is not considered a necessary part of the detailed description of the present invention. If such a detailed description is desired, reference is made to *The Chemistry of Organic Film Formers*, by D. H. Soloman, copyright 1977, Robert E. Krieger Publishing Company, pages 4 to 19.

The compositions of the present invention can also contain reinforcing materials to improve physical properties such as tensile strength, heat sag, and stiffness properties. Reinforcing materials can be of any conventional type and include fibrous reinforcements, non-fibrous resinforcements, and fillers. Useful fillers include calcium carbonate, clay, talc, and hydrated alumina. Useful non-fibrous reinforcements include hammer-mill glass flakes, suzorite mica, and wollastonite. Typically, fibrous reinforcements such as glass fibers are utilized. The fibers are typically very short, generally $\frac{1}{4}$ inch to 2 inches and they comprise from about 10 percent to 50 percent by weight based on the total weight of the composition. Other fibrous materials which can be used include boron fibers, wood and vegetable fibers and graphite fibers.

Besides the ingredients mentioned above, other materials can be added to the composition. Examples include mold release agents such as zinc stearate and calcium stearate, catalyst accelerators such as cobalt octoate or cobalt naphthenate, gelation inhibitors such as hydroquinone as well as stabilizers of various types such as for example ultraviolet light stabilizers. The amounts of these other components are quite small and do not generally in combination exceed about 10 percent by weight of the total weight of the polymerizable composition.

The claimed coating composition can be used either in conventional compression molding or injection molding. For injection molding, in general, the thickened composition is forced under pressure from a holding chamber or reservoir through a feeding channel into the cavity of an injection mold. The composition is then subjected to both heat and pressure to form an at least partially cured, molded article. Generally, temperatures utilized range from about 50° C. to about 200° C., preferably 75° C. to 185° C., and pressures range from about 50 psi to 3,000 psi; the time required typically ranging from about 1 to 3 minutes.

In compression molding, the amount of thickened composition charged to the mold should be sufficient to substantially fill the mold. The mold is closed and sufficient heat is applied to solidify the composition into an at least partially cured article. As in injection molding discussed above, temperatures generally from about 50° C. to about 200° C., preferably 75° C. to 185° C. are utilized. Pressures employed also range from about 50 psi to 3,000 psi; the time required also ranging from about 1 to 3 minutes. The resultant molded article has an integrally molded outer surface shaped in the reverse image of the mold.

The invention will be further described in connection with the examples which follow. These examples are given as illustrative of the invention and are not to be construed as limiting it to their details.

EXAMPLES

The following examples, Example I through IV, illustrate the thickening effect of a polyisocyanate in a composition containing an unsaturated polyester and a hydroxyl-terminated polybutadiene and the effect of the level of hydroxyl-terminated polybutadiene on the hardness of an unsaturated polyester based sheet molding composition.

| Ingredients (Parts by Weight) | Example I | Example II | Example III | Example IV |
|---|---|---|---|---|
| unsaturated polyester[1] | 2000 | 1700 | 1500 | 1700 |
| hydroxyl-terminated polybutadiene[2] | 0 | 300 | 500 | 300 |
| tert-butyl perbenzoate (free radical initiator) | 20 | 20 | 20 | 20 |
| calcium carbonate | 3000 | 3000 | 3000 | 3000 |
| polyisocyanate[3] | 37 | 37 | 37 | 0 |
| zinc stearate (mold release agent) | 100 | 100 | 100 | 100 |
| 1 inch chopped glass fiber[4] | 1719 | 1719 | 1719 | 1707 |
| HBT Brookfield viscosity[5] in centipoises at 80° F. (27° C.) and TF spindle at a speed of 1 RPM | | | | |
| 3 days | $0.40 \times 10^6$ | $10 \times 10^6$ | $24.8 \times 10^6$ | $0.8 \times 10^{6*}$ |
| 13 days | $0.112 \times 10^6$ | $8.4 \times 10^6$ | $29.6 \times 10^6$ | $1.4 \times 10^6$ |
| appearance and properties of molded panel | gross fiber pattern, very brittle, delamination on bending, and exhibited cracked areas | reduced fiber pattern, less delamination on bending, no cracks present, and better gloss | less fiber pattern than Example II, less delamination on bending and no cracks present | not molded due to severe exudation |
| Barcol hardness[6] | 55 to 68 | 25 to 35 | 0 to 10 | |

[1]This unsaturated polyester was a propylene maleate polyester reacted to an acid number of 20 and thinned to 67 percent solids in styrene.
[2]Commercially available from Arco Polymers, Inc. as R45-HT, having a number average molecular weight of 2800.
[3]Commercially available from Mobay Chemical Corp. as MONDUR MR.
[4]Commercially available from PPG Industries, Inc. as PPG 521 Roving. The glass fiber was added in an amount such that after addition it was present as 25 percent of the total weight of the composition.
[5]HBT Brookfield viscosity was measured on the composition minus glass fiber.
[6]Barcol hardness was determined with a 934 Impressor. It is a comparable measure of hardness using a scale of values of 0 to 100. The higher the number, the harder the material.
*Exhibited exudation after 7 days.

In the above example, the polybutadiene and tert-butyl perbenzoate were added into the unsaturated polyester with continuous, vigorous agitation. The calcium carbonate and zinc stearate were then added together, followed by the polyisocyanate. Stirring was continued to form a uniform composition. To prepare the molded panels the aforesaid compositions were each, in turn, charged to a conventional chrome plated compression mold and molded at a pressure of 1000 psi and at a temperature of from 140° C. to 150° C. for three minutes.

EXAMPLE V

This example illustrates the thickening effect of a polyisocyanate on a composition containing a polyol polyacrylate and a hydroxyl-terminated polybutadiene.

| Ingredient | Parts by Weight |
|---|---|
| trimethylolpropane trimethacrylate | 37 |
| hydroxyl-terminated polybutadiene[1] | 13 |
| butadiene/styrene polymer mixture[2] | 3.5 |
| methyl methacrylate | 46.5 |
| tert-butyl perbenzoate (free radical initiator) | 0.67 |
| tert-butyl peroctoate (free radical initiator) | 0.67 |
| alumina trihydrate[3] | 200 |
| alumina trihydrate[4] | 50 |
| zinc stearate (mold release agent) | 6 |
| dibutyltin dilaurate | 0.05 |
| polyisocyanate[5] | 1.73 |

[1]Commercially available from Arco Polymers, Inc. as R45-HT, having a number average molecular weight of 2800.
[2]Commercially available as SOLPRENE 312 from Phillips Petroleum Co.
[3]Commercially available as C-331 from Alcoa Company, having a particle size of 3 to 10 microns.
[4]Commercially available as H-710 from Alcoa Company, having a particle size less than 3 microns.
[5]Commercially available from Mobay Chemical Corp. as MONDUR MR.

In the above example, the hydroxyl-terminated polybutadiene was dissolved with stirring in a mixture of the vinyl monomers. The alumina trihydrate, zinc stearate, free radical initiators, and catalyst were added followed by the polyisocyanate. The components were blended with high shear mixing using an air motor and a propeller stirring blade to form a uniform composition. The initial Brookfield viscosity at 80° F. (27° C.) at number 7 spindle and a speed of 20 RPM was 11,400 centipoises. The HBT Brookfield viscosity measured at 80° F. (27° C.) with a TF spindle at 1 RPM at molding was 41 million centipoises.

EXAMPLES VI TO VIII

The following examples, Examples VI through VIII, illustrate that a molding composition comprising an unsaturated polyester, and hydroxyl-terminated polybutadiene and thickened with a polyisocyanate exhibits better phase stability, i.e., no exudation, compared to a similar molding composition thickened with $M_gO$, a conventional thickener for unsaturated polyesters.

| Ingredients (Parts by Weight) | Example VI | Example VII | Example VIII |
|---|---|---|---|
| unsaturated polyester[1] | 75 | 75 | 75 |
| hydroxyl-terminated polybutadiene[2] | 25 | 25 | 25 |
| tert-butyl perbenzoate (free radical initiator) | 1 | 1 | 1 |
| zinc stearate (mold release agent) | 4 | 4 | 4 |
| dibutyltin dilaurate | 0.1 | 0.1 | 0.1 |
| calcium carbonate | 150 | 150 | 150 |
| polyisocyanate[3] | 3 | 0 | 0 |
| thickener[4] | 0 | 8 | 0 |
| HBT Brookfield Viscosity in centipoises at 80° F. (27° C.) and TF spindle at a speed of 1 RPM | | | |
| Initial | Greater than $80 \times 10^6$ | $17.2 \times 10^6$ | $4.4 \times 10^6$ |
| After 3 days | No exudation | Exudation | Exudation |

[1]This unsaturated polyester was a propylene maleate polyester coated to an acid number of 20 and thinned to 67 percent solids in styrene.
[2]Commercially available from Arco Polymers, Inc. as R45-HT, having a number average molecular weight of 2800.
[3]Commercially available from Mobay Chemical Corp. as MONDUR MR.
[4]The thickener was a dispersion of magnesium oxide commercially available from PPG Industries, Inc. as RS 59003.

The above examples were prepared in the same manner as Examples I through IV.

Although the invention has been described with specific references and specific details of embodiments thereof, it is to be understood that it is not intended to be so limited since changes and alterations therein may be made by those skilled in the art which are within the full intended scope of this invention as defined by the appended claims.

What is claimed is:

1. In a method for preparing a sheet molding compound composition wherein the composition which is curable by free-radical initiated polymerization consists essentially of
    (a) from 25-55 weight percent of a multifunctional acrylate or methacrylate ester of a polyol having 2-5 hydroxyl groups,
    (b) from 10-25 weight percent of an active hydrogen containing polydiene polymer having a molecular weight between 1,000 and 5,000, and
    (c) from 20-50 weight percent of a $C_1$-$C_4$ alkyl ester of acrylic or methacrylic acid; the improvement which comprises incorporating into said composition a polyisocyanate in an amount sufficient to thicken said composition to a viscosity of from $2 \times 10^6 - 160 \times 10^6$ centipoise and in an amount such that the NCO to OH equivalent ratio of said composition is within the range of 0.05 to 1.5:1.

2. The method according to claim 1 wherein the polydiene of component (b) is hydroxyl terminated.

3. The method according to claim 2 wherein the hydroxyl terminated polymer of a diene is a homopolymer of 1,3-butadiene.

4. The method according to claim 3 wherein the multifunctional methacrylate ester of said polyol of component (a) is trimethanol propane trimethacrylate.

5. The method according to claim 4 wherein said alkyl ester of component (c) is methyl methacrylate.

* * * * *